United States Patent [19]

Gregor et al.

[11] Patent Number: 4,924,466
[45] Date of Patent: May 8, 1990

[54] DIRECT HARDWARE ERROR IDENTIFICATION METHOD AND APPARATUS FOR ERROR RECOVERY IN PIPELINED PROCESSING AREAS OF A COMPUTER SYSTEM

[75] Inventors: Steven L. Gregor; Victor S. Lee, both of Endicott, N.Y.

[73] Assignee: International Business Machines Corp., Armonk, N.Y.

[21] Appl. No.: 213,523

[22] Filed: Jun. 30, 1988

[51] Int. Cl.[5] ............................................. G06F 11/00
[52] U.S. Cl. ..................................... 371/12; 364/200; 371/16.1
[58] Field of Search ...................... 371/12, 16, 16.1; 364/200, 900

[56] References Cited

- U.S. PATENT DOCUMENTS

| | | | |
|---|---|---|---|
| 4,044,337 | 8/1977 | Hicks et al. | 364/200 |
| 4,164,017 | 8/1979 | Randell et al. | 364/200 |
| 4,423,508 | 12/1983 | Shiozaki et al. | 371/16 |
| 4,429,360 | 1/1984 | Hoffman et al. | 364/200 |
| 4,443,849 | 4/1984 | Ohwada | 364/200 |
| 4,453,093 | 6/1984 | Boudreau | 371/16 X |
| 4,493,035 | 1/1985 | MacGregor et al. | 364/200 |
| 4,521,847 | 6/1985 | Ziehm et al. | 371/12 X |
| 4,524,415 | 6/1985 | Mills, Jr. et al. | 364/200 |
| 4,571,677 | 2/1986 | Hirayama et al. | 364/200 |
| 4,633,467 | 12/1986 | Abel et al. | 371/16 |
| 4,661,953 | 4/1987 | Venkatesh et al. | 371/16 |
| 4,697,266 | 9/1987 | Finley | 371/12 |
| 4,703,481 | 10/1987 | Fremont | 371/12 |
| 4,783,783 | 11/1988 | Nagai et al. | 371/12 |

FOREIGN PATENT DOCUMENTS 32-27344 2/1957 Japan
36-139836 6/1961 Japan

OTHER PUBLICATIONS

Jones, Jr. et al., Error Tracing Arrangements of a Pipelined Processor, IBM Technical Disclosure Bulletin vol. 28, Jul., 1985, No. 2, pp. 621-624.
Earle et al., Multiprocessing Checkpoint Retry, IBM Technical Disclosure Bulletin vol. 14, No. 2, Jul., 1971, pp. 358-361.

Primary Examiner—Charles E. Atkinson

[57] ABSTRACT

A computer system having trace arrays and registers that provide error tracing that permits retry of operations in a pipelined, multiprocessing environment after the operations have been allowed to quiesce. The trace arrays in each retry domain include one master trace array. The master arrays store an event trace identification code, a cross reference event trace indentification code, an error flag, and a cross reference bit. The trace arrays provide a record of the events occurring between the occurrence of an error and the completion of quiescence, when retry can be attemped. Error registers are used to record events in which errors occur during quiescence, where trace arrays cannot be implemented.

14 Claims, 13 Drawing Sheets

FIG.2

L2CNTL TRACE

| L2ID | MCID | XR | CMD/ADR | E |
|---|---|---|---|---|
| A |  |  | • • • |  |
| B |  |  | • • • |  |
| C |  |  | • • • |  |
|  |  |  |  |  |
|  |  |  |  |  |

L2CC/L2 TRACE

| L2ID | CMD/ADR | E |
|---|---|---|
| A | • • |  |
|  |  |  |
|  |  |  |
|  |  |  |
|  |  |  |

BSUC TRACE

| MCID | CMD/ADR | E |
|---|---|---|
| 12 | • • |  |
| 14 | • • |  |
|  |  |  |
|  |  |  |
|  |  |  |

L2CC/MC TRACE

| MCID | CMD/ADR | E |
|---|---|---|
| 14 | • • |  |
|  |  |  |
|  |  |  |
|  |  |  |
|  |  |  |

MEMCTL TRACE

| MCID | L2ID | XR | CMD/ADR | E |
|---|---|---|---|---|
| 12 |  |  | • • • |  |
| 13 |  |  | • • • |  |
| 14 |  |  | • • • |  |
| 15 |  |  | • • • |  |
|  |  |  |  |  |
|  |  |  |  |  |

FIG. 3

L2CNTL TRACE

| L2ID | MCID | XR | CMD/ADR | E |
|------|------|----|---------|----|
| A    |      |    | • • •   |   |
| B    |      |    | • • •   |   |
| C    |      |    | • • •   |   |
|      |      |    |         |   |
|      |      |    |         |   |
|      |      |    |         |   |

L2CC/L2 TRACE

| L2ID | CMD/ADR | E |
|------|---------|---|
| A    | • •     |   |
|      |         |   |
|      |         |   |
|      |         |   |
|      |         |   |
|      |         |   |

BSUC TRACE

| MCID | CMD/ADR | E |
|------|---------|---|
| 12   | • •     |   |
| 14   | • •     |   |
| 16   | • •     |   |
|      |         |   |
|      |         |   |
|      |         |   |

L2CC/MC TRACE

| MCID | CMD/ADR | E |
|------|---------|---|
| 14   | • •     |   |
|      |         |   |
|      |         |   |
|      |         |   |
|      |         |   |
|      |         |   |

MEMCTL TRACE

| MCID | L2ID | XR | CMD/ADR | E |
|------|------|----|---------|----|
| 12   |      |    | • • •   |   |
| 13   |      |    | • • •   |   |
| 14   |      |    | • • •   |   |
| 15   |      |    | • • •   |   |
| 16   | C    | I  | • • •   |   |
|      |      |    |         |   |
|      |      |    |         |   |

FIG.4

L2CNTL TRACE

| L2ID | MCID | XR | CMD/ADR | E |
|---|---|---|---|---|
| A | | | ● ● ● | |
| B | | | ● ● ● | |
| C | | | ● ● ● | |
| D | | | ● ● ● | |
| E | | | ● ● ● | |
| F | 16 | 1 | ● ● ● | |
| G | | | ● ● ● | |
| | | | | |

L2CC/L2 TRACE

| L2ID | CMD/ADR | E |
|---|---|---|
| A | ● ● | |
| F | ● ● | |
| | | |
| | | |
| | | |
| | | |

BSUC TRACE

| MCID | CMD/ADR | E |
|---|---|---|
| 12 | ● ● | |
| 14 | ● ● | |
| 16 | ● ● | |
| | | |
| | | |
| | | |

L2CC/L2 TRACE

| MCID | CMD/ADR | E |
|---|---|---|
| 14 | ● ● | |
| 16 | ● ● | |
| | | |
| | | |
| | | |
| | | |

MEMCTL TRACE

| MCID | L2ID | XR | CMD/ADR | E |
|---|---|---|---|---|
| 12 | | | ● ● ● | |
| 13 | | | ● ● ● | |
| 14 | | | ● ● ● | |
| 15 | | | ● ● ● | |
| 16 | C | 1 | ● ● ● | |
| | | | | |
| | | | | |

FIG.5

L2CNTL TRACE

| L2ID | MCID | XR | CMD/ADR | E |
|------|------|----|---------|---|
| A    |      |    | • • •   |   |
| B    |      |    | • • •   |   |
| C    |      |    | • • •   |   |
| D    |      |    | • • •   |   |
| E    |      |    | • • •   |   |
| F    | 16   | 1  | • • •   |   |
| G    |      |    | • • •   |   |
| H    |      |    | • • •   |   |
|      |      |    |         |   |

L2CC/L2 TRACE

| L2ID | CMD/ADR | E |
|------|---------|---|
| A    | • •     |   |
| F    | • •     |   |
| H    | • •     |   |
|      |         |   |
|      |         |   |
|      |         |   |

BSUC TRACE

| MCID | CMD/ADR | E |
|------|---------|---|
| 12   | • •     |   |
| 14   | • •     |   |
| 16   | • •     |   |
|      |         |   |
|      |         |   |
|      |         |   |

L2CC/MC TRACE

| MCID | CMD/ADR | E |
|------|---------|---|
| 14   | • •     |   |
| 16   | • •     |   |
|      |         |   |
|      |         |   |
|      |         |   |
|      |         |   |

MEMCTL TRACE

| MCID | L2ID | XR | CMD/ADR | E |
|------|------|----|---------|---|
| 12   |      |    | • • •   |   |
| 13   |      |    | • • •   |   |
| 14   |      |    | • • •   |   |
| 15   |      |    | • • •   |   |
| 16   | C    | 1  | • • •   |   |
|      |      |    |         |   |
|      |      |    |         |   |

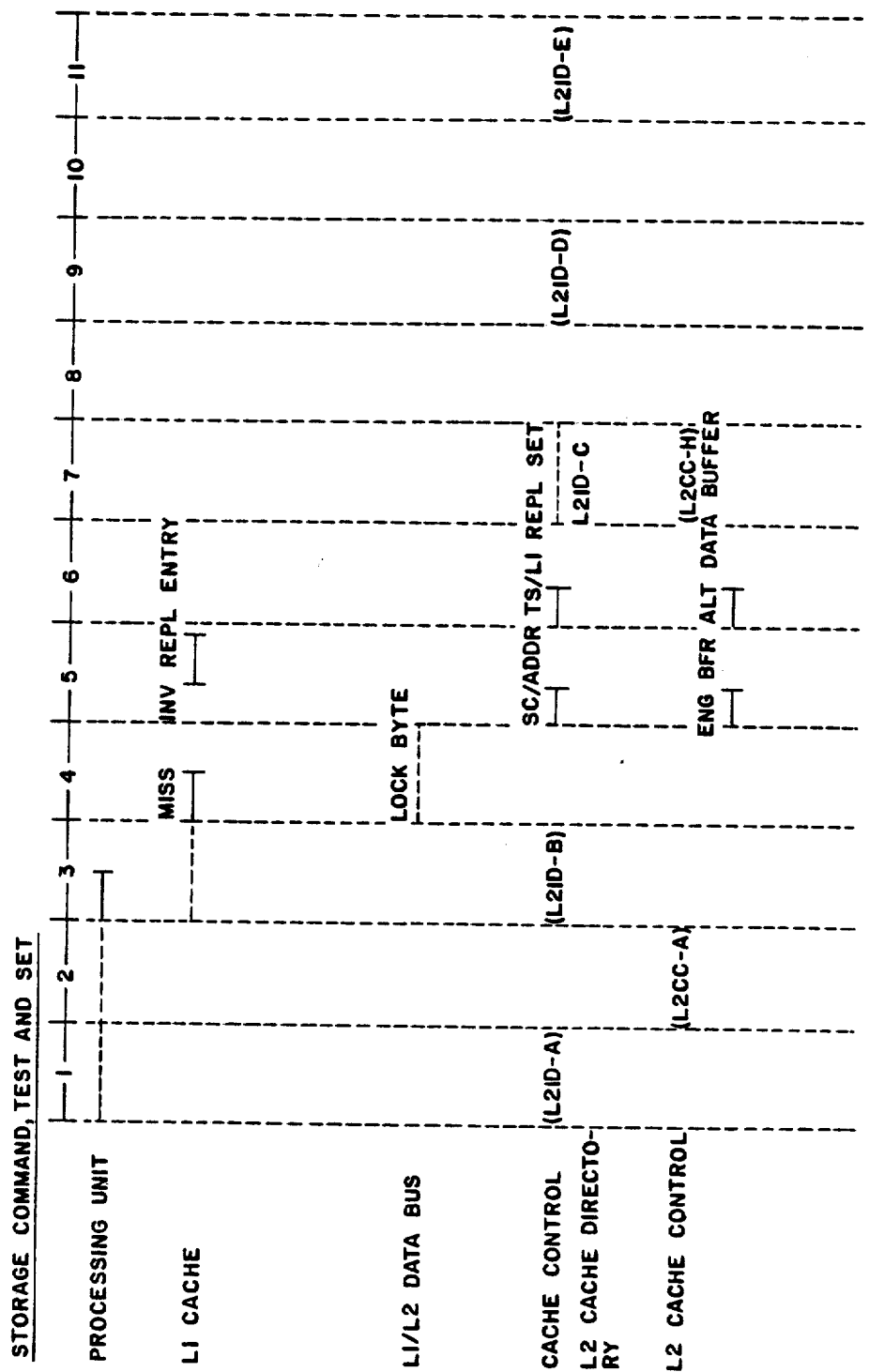

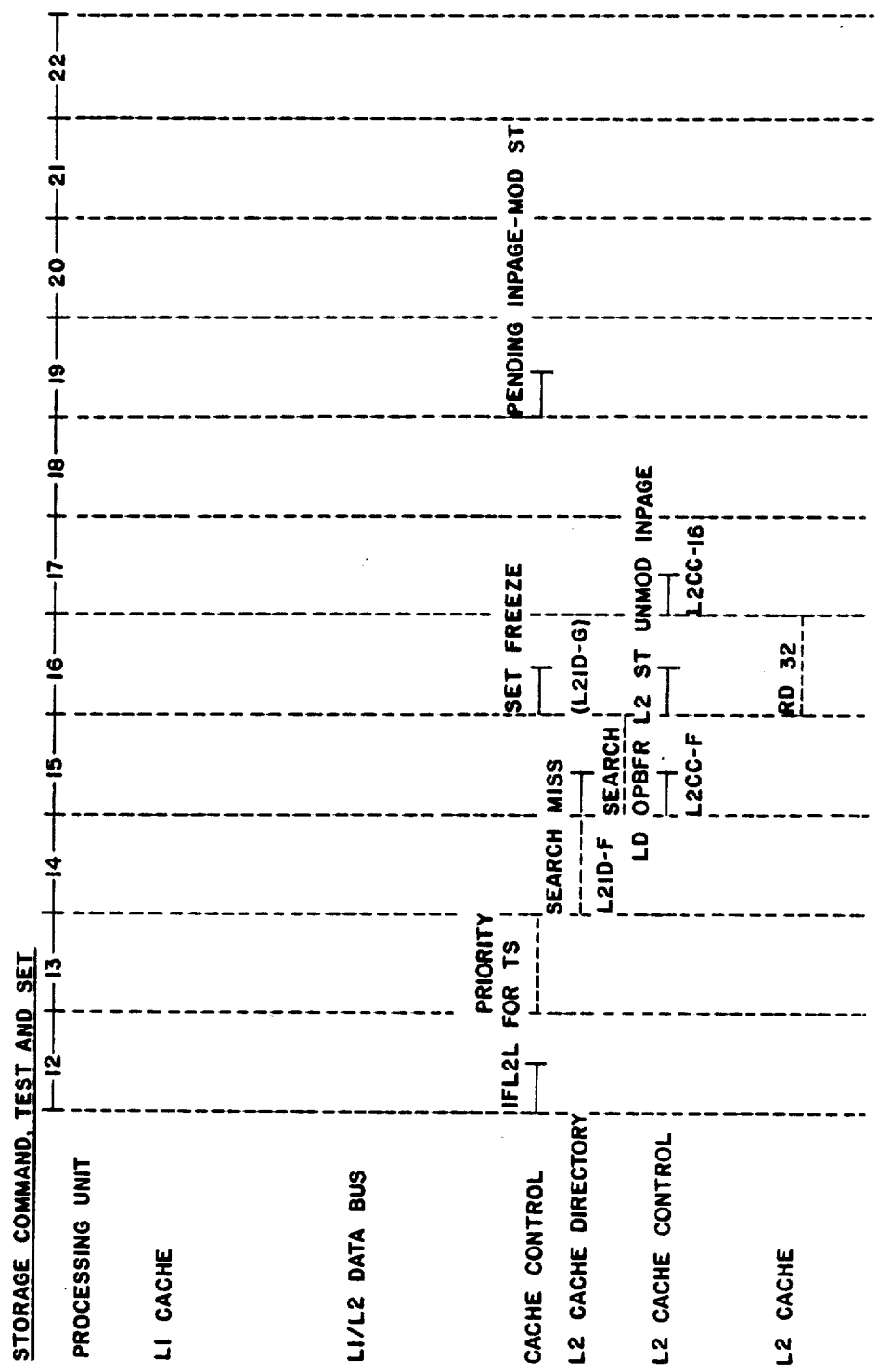

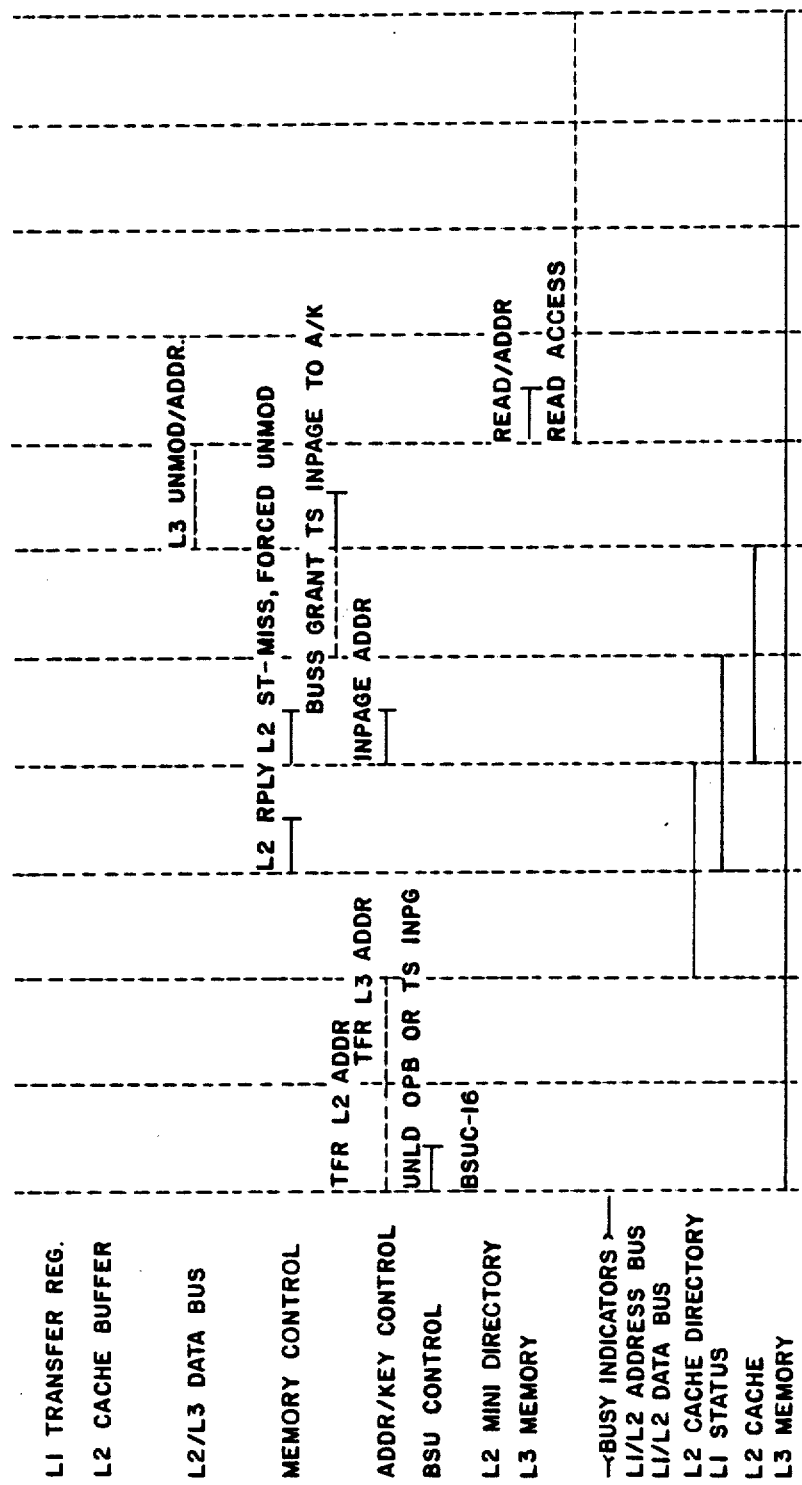

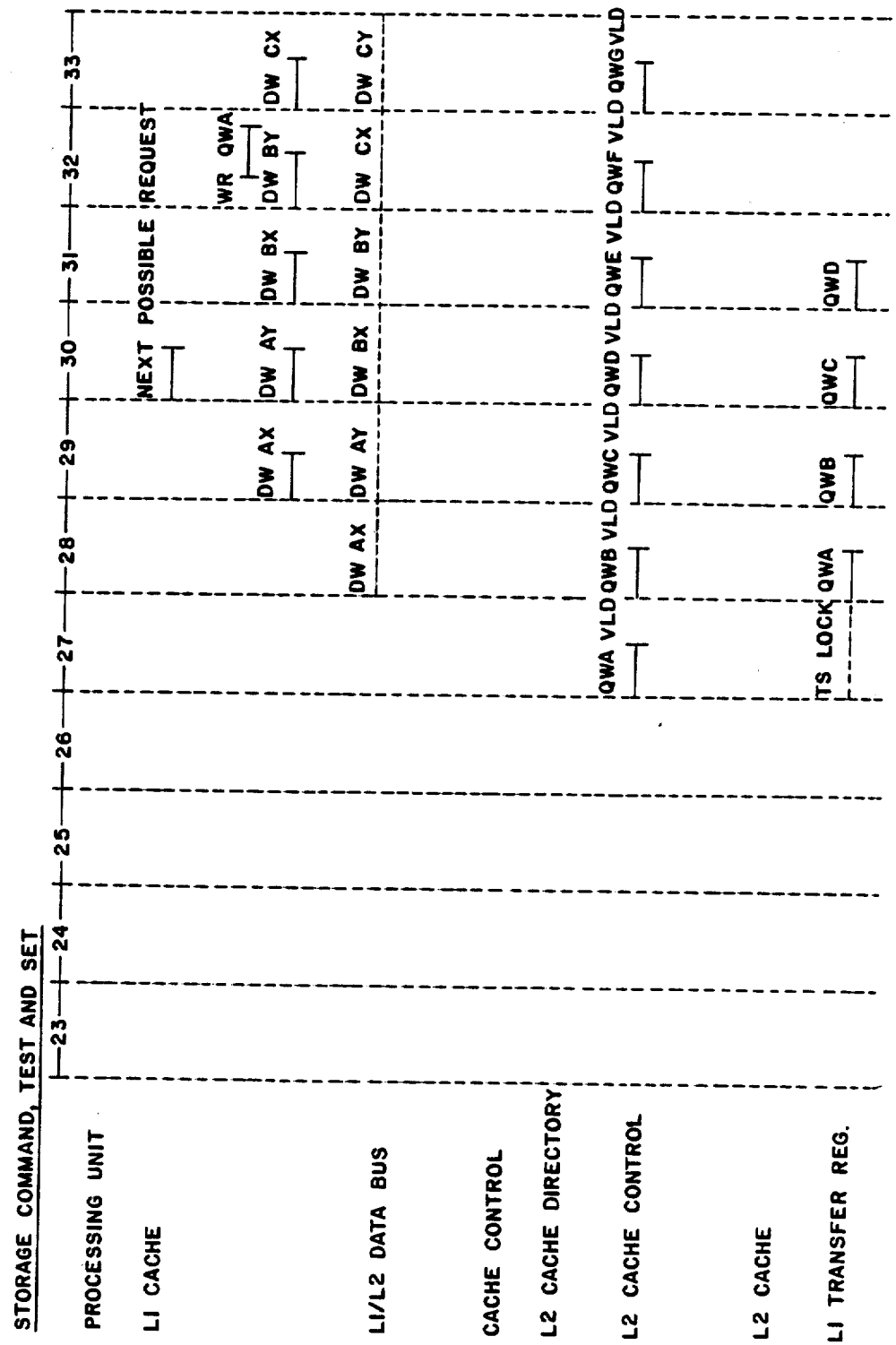

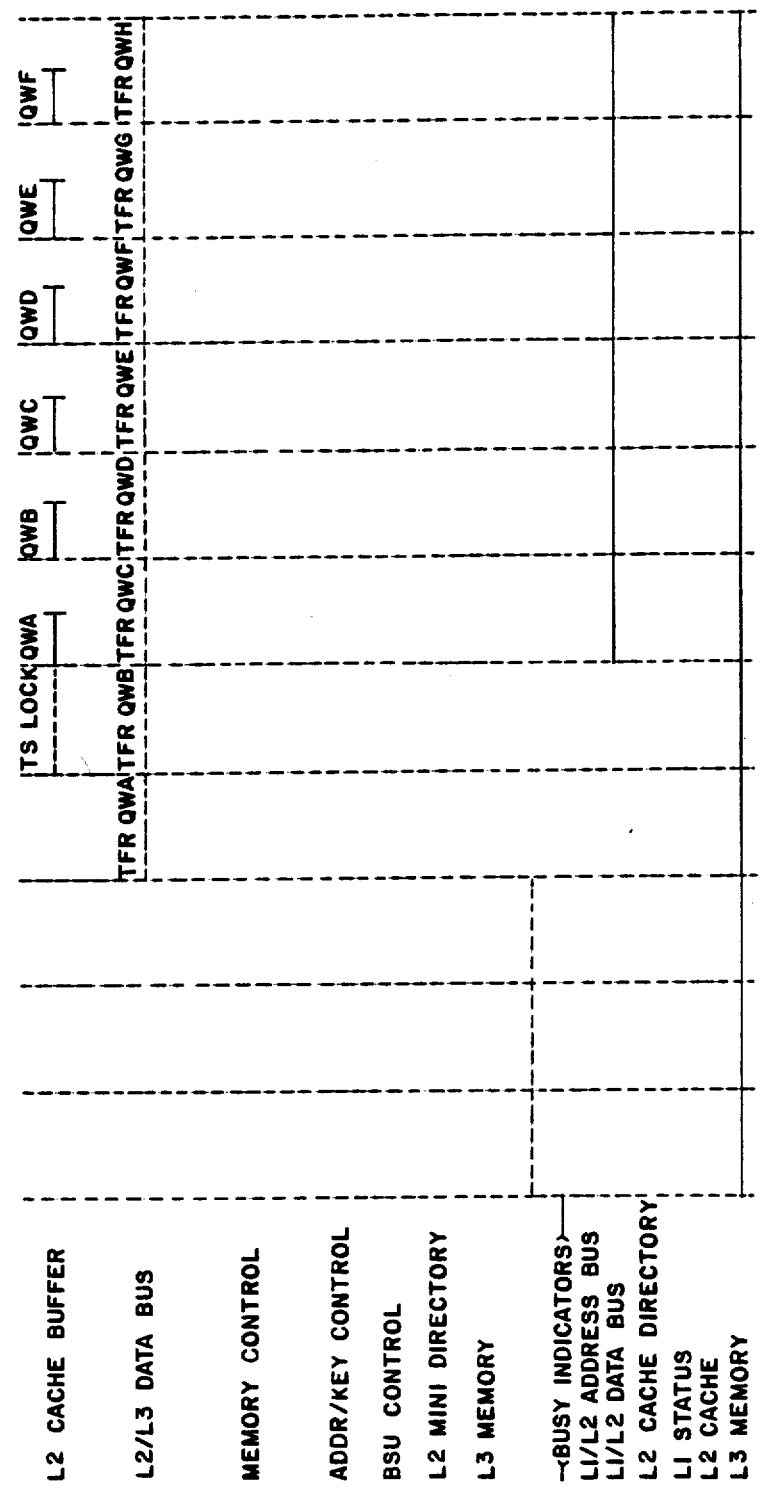

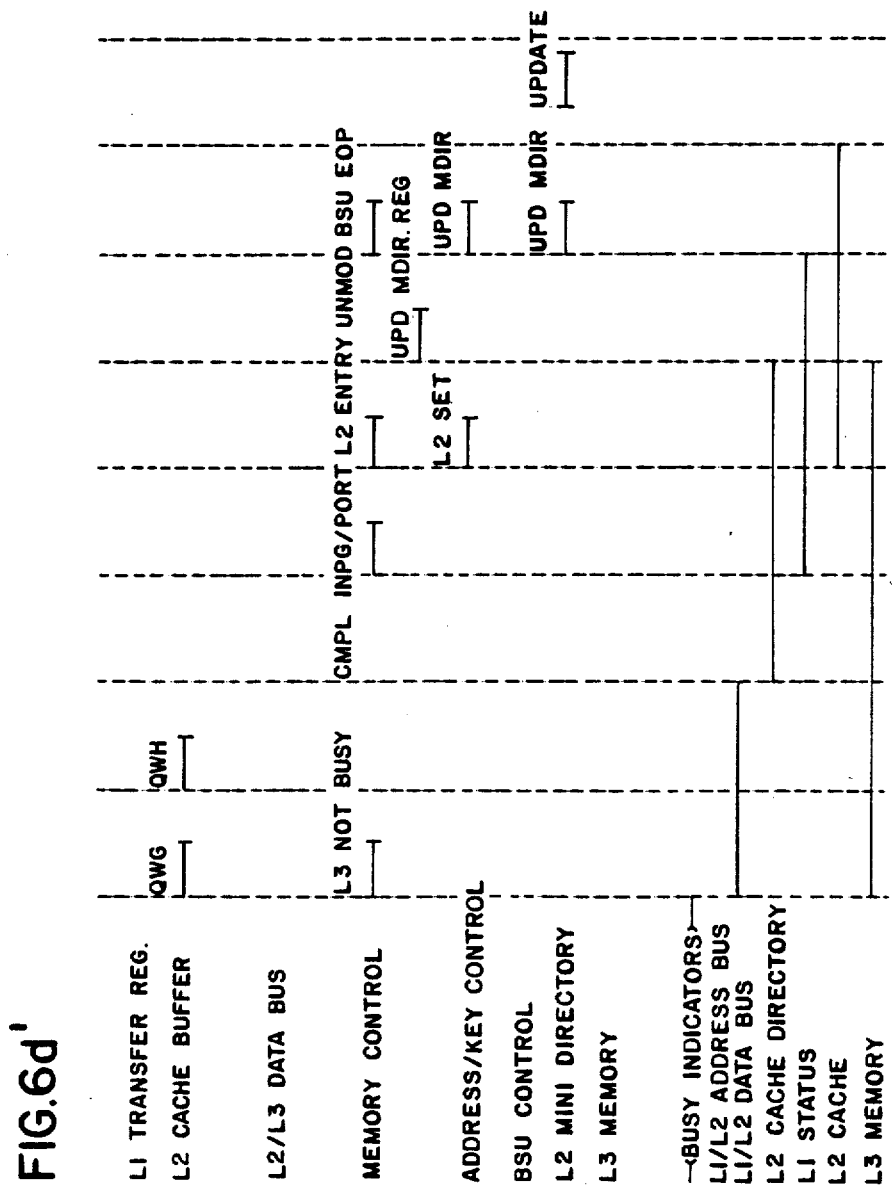

DIRECT HARDWARE ERROR IDENTIFICATION METHOD AND APPARATUS FOR ERROR RECOVERY IN PIPELINED PROCESSING AREAS OF A COMPUTER SYSTEM

BACKGROUND OF THE INVENTION

1. Field of the Invention

The present invention relates to error identification in areas of a computer system that are used in common by multiple concurrent operations or by multiple independent processors, or by both. More particularly, the invention relates to an apparatus and method for minimizing the impact of a hardware error that occurs in an area in which operations are extensively interleaved or pipelined, or one that is detected in such an area after having been propagated into the area from some other part of the computer system.

2. Discussion of Related Art

Where the reliability and availability of the computer system are vitally important, the system's ability to recover from a hardware error is an issue of primary importance. To achieve this, it is necessary to be able to identify what needs to be recovered. However, the increased complexity of computer hardware that permits high-speed execution of multiple operations simultaneously is making such error identification extremely difficult when errors are detected in common areas of the hardware.

Various types of error flags that identify hardware devices in which an error has been detected are well known in the art: parity check flags associated with common data buses and instruction units, flags associated with multiplier and ALU saturation and overflow conditions and other flags for particular failure modes or individual pieces of hardware. However, in the more complex systems, more than one operation is likely to be affected by a hardware error and more than one error flag is likely to be set before the affected operations are halted.

A secondary error discrimination method and apparatus is described in co-pending U.S. patent application Ser. No. 07/211,584 filed June 27, 1988 by P. D. Harney et al. and commonly assigned, which is incorporated herein by reference. This secondary error lock-out system records which error was the first error that occurred within a given area in the computer system, by latching all error flags that are set within the single clock cycle in which the first error is reported. These errors are the "primary errors." However, the processing is then halted and only the device in which the error occurred is identified.

In systems that do not involve pipelining, multi-progamming or multiprocessing, one known method for pinpointing the particular operation affected by an error uses the processor's Instruction Length Register (ILR). The ILR normally contains the address of the one instruction that can be executed at a given time in such systems. When an error is detected in the processor, the ILR is promptly locked. This permits the contents of the ILR to be used as a pointer to the instruction that caused the error, as disclosed in IBM Technical Disclosure Bulletin, Vol. 28, No. 2, July 1985. However, this abruptly halts the processor's operation.

In complex systems, the foremost concern is to identify the error with a specific operation, not just a particular processor. Identification of the specific operation in which a hardware error occurred permits other operations that were already being executed in that retry domain to attempt to complete normally, that is, to "quiesce," which avoids retrying concurrent, unaffected operations. Retrying all those operations would produce unnecessary disruption of computer processing. Quiescing also reduces the need for operator intervention and scope of the retry operations that are required, by avoiding having to retry operations that were not affected by the error.

Software identification of a particular instruction giving rise to a software interrupt can be implemented in a multiprocessing environment by means of a uniquely assigned "instruction number", as disclosed in the copending U.S. patent application Ser. No. 200,688, filed May 31, 1988, and commonly assigned. However the occurrence of a software interrupt in a particular operation does not require, nor does the disclosed invention provide, a method or means for tracing of the subsequent history of that operation, because the affected operation has been halted by the interrupt at the affected point. No quiescing occurs in the event of such interrupts.

In areas where hardware is highly specialized and also highly interconnected, such as a cache storage area, or an I/O channel controller, error propagation is inevitable. The high degree of specialization in such areas makes a complete picture of an error hard to obtain, and the pipelining used to assure more efficient use of such areas compounds the problem. Moreover, the redundancy provided by multiprocessing computer systems increases a computer's ability to recover from errors, the complexity of the task of tracing a hardware error through multiple concurrent operations to locate data that may have been affected by an error, and to identify the operations that must be retried in these systems, is much more disruptive and time consuming.

Error tracing in pipelined computer operations is complicated by the fact that an error there is not generally detected in the same machine clock cycle in which it occurs. Furthermore, it is generally desirable to allow all operations that are unaffected and can complete to do so before processing is halted in areas where there is extensive pipelining. This is also particularly true in data storage areas and areas where block transfers are made, as is explained below. Thus the subsequent effects of an error, not just its location and present extent, must be identified in such computer operations.

SUMMARY OF THE INVENTION

A computer system in accordance with the present invention has retry domains comprising hardware devices that each include a trace array having at least one entry. Each entry in the trace array includes at least one event trace ID and an error flag. The event trace ID identifies an operation occurring in said device, and the insertion of the event trace ID in the trace array is initiated by the execution of that operation in the retry domain.

Each entry may also include other retry information associated with that trace ID, such as a related event trace ID from another retry domain, or a command, an address or a processor ID. Historical entries may also be included in the trace array to provide a record of the events occurring between the time the error occurs and the time processing stops.

When an operation is passed from a first retry domain to a second retry domain the trace array for the second retry domain may include an event trace ID for the first retry domain. The entry in the second trace array may also contain a cross-reference flag indicating whether or not the first retry domain initiated the event occurring in the second retry domain.

Devices within the retry domain may include respective device trace arrays. The event trace ID's for a given retry domain may be either sequentially assigned numbers or numbers that are unique in some other way to the identified event among event trace ID's recorded in the trace arrays of that retry domain.

Error identification in accordance with the present invention determines an event trace ID for each operation to be executed in a given retry domain, and then records that event trace ID in a master trace array for that retry domain when the given operation is executed in that retry domain. The event trace ID uniquely identifies a given operation in that retry domain among any event trace ID's for said retry domain that are recorded in trace array entries in said retry domain. An error flag is set in a given entry in the trace array of the retry domain when an error occurs in the device associated with that trace array during the event indicated by the event trace ID in the given entry.

An event trace ID for a first retry domain may also be recorded in a master trace array for the next retry domain in which the given operation is executed, so that the event trace ID associated the operation in the previous retry domain is also recorded in the next retry domain in an entry containing that next retry domain's event trace ID for the operation. A cross-reference flag in that entry in the master trace array for each retry domain may be used to indicate whether or not the operation was initiated outside the respective retry domain.

It is a principal object of the present invention to identify the particular operations that must be retried to avoid having to retry all operations that were being executed within a given retry domain when an error occurred.

It is a further object of the present invention to identify the particular operations that must be retried, in view of the fact that error propagation is unavoidable in some complex systems, to avoid having to retry all of the operations that were executed in the given subsystem after an error was detected in the component and before operations therein were halted.

It is a further object of the present invention to identify the particular operations that must be retried, in view of the fact that error propagation will occur if all operations executing in this affected retry domain are allowed to quiesce, so that the number of retry operations is minimized.

Finally, it is a further object of the present invention to identify the particular events within these operations that have been affected by a hardware error and must be retried, to avoid having to retry all operations from the point at which they began executing within a subsystem.

BRIEF DESCRIPTION OF THE DRAWINGS

The particular features and advantages of the present invention will be more clearly understood when the detailed description of a preferred embodiment given below is considered in conjunction with the drawings, in which:

FIG. 2 shows the entries recorded in trace arrays for each of the two retry domains shown in FIG. 1 and for selected devices in these retry domains that are constructed and operated in accordance with the present invention, at clock cycle 8 during a "test and set" operation, when event L2ID-C becomes active in the common cache (L2) retry domain;

FIG. 3 shows the entries recorded in the trace arrays of FIG. 2 at cycle 12, when event L2ID-C in the L2 retry domain initiates event MCID-16 in the memory control (MC) retry domain;

FIG. 4 shows the entries recorded in the trace arrays of FIG. 2 at cycle 17, when event L2CC-16 occurs in the MC retry domain, after event L2ID-G occurs in the L2 retry domain, and after event MCID-16 in the MC retry domain initiates event L2ID-F in the L2 retry domain;

FIG. 5 shows the entries recorded in the trace arrays of FIG. 2 at cycle 37, when event L2ID-H is initiated by the completion of the data transfer event MCID-16 when it is processed by the L2 cache controller in the L2 retry domain; and FIGS. 6a through 6d and 6a' through 6d' are a timing diagram showing some of the events occurring in the storage subsystem of FIG. 1 during the execution of a "Test and set" instruction.

DETAILED DESCRIPTION OF A PREFERRED EMBODIMENT

Figure 1:
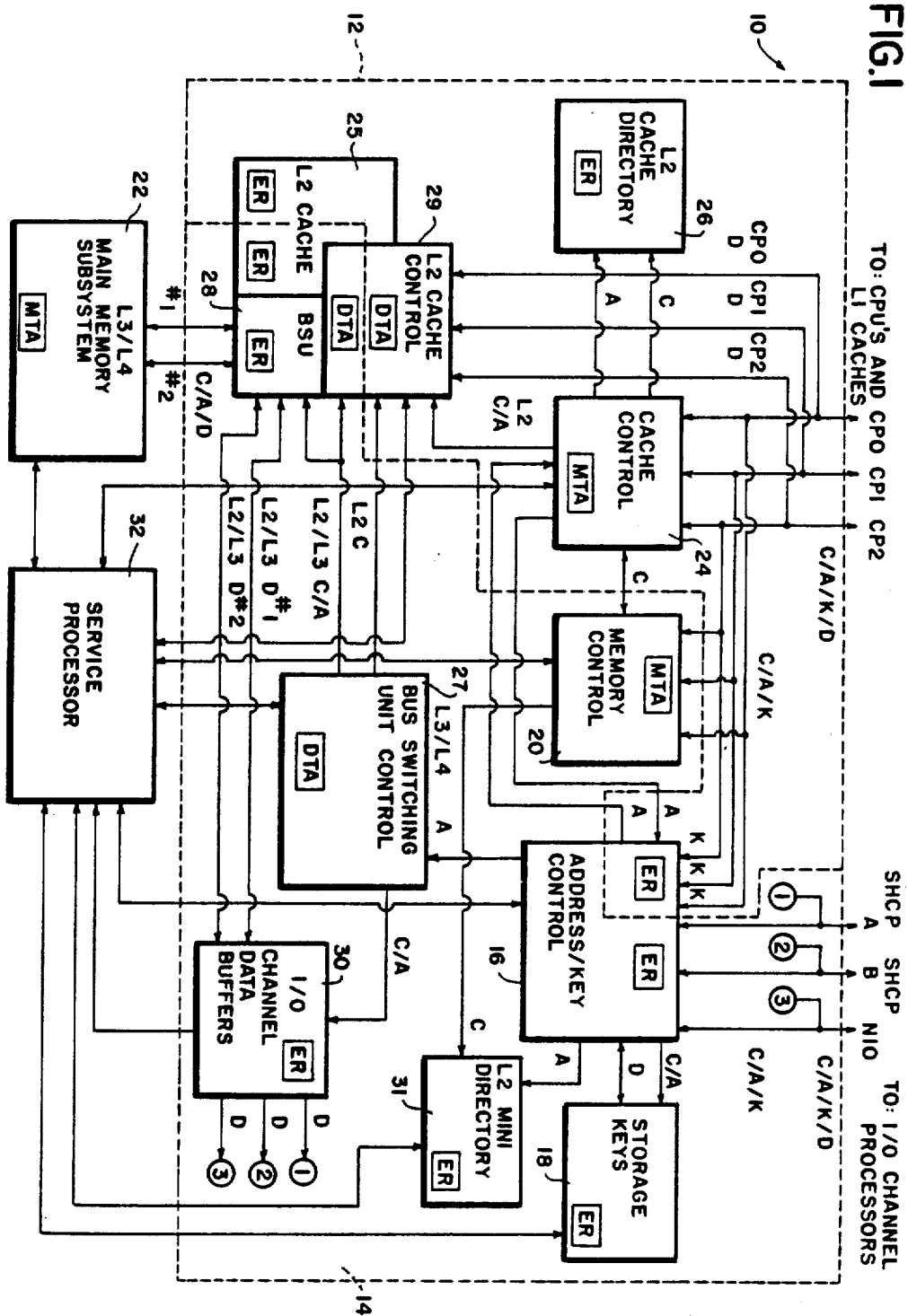
FIG. 1 is a schematic diagram of the storage subsystem in accordance with a preferred embodiment of the present invention.

In a storage subsystem 10 in accordance with a preferred embodiment of the present invention, shown in FIG. 1, various operations performed within the subsystem are pipelined. Thus at any one time the common cache (L2) retry domain indicated by the reference numeral 12 and the memory control (MC) retry domain indicated by reference numeral 14 may be processing operations for separate instructions concurrently. Furthermore, this storage subsystem 10 operates in a multiprocessing environment wherein it is responsive to inputs from three independent central processing units CP0, CP1 and CP2. The storage subsystem 10 is also responsive to two shared-channel processors, SHCPA and SHCPB, which each provide pipelined data transfer for peripheral devices, and a slower, simpler I/O subsystem (NIO) which provides interleaved data transfer for multiple peripheral devices.

Each of the central processing units has a respective 32-kilobyte, first-level (L1) cache memory (not shown) that the respective central processing unit uses for local, temporary storage. A higher level (L2) cache memory 25 is also provided that is common to all three central processing units. The storage subsystem 10 communicates through two parallel ports with the main memory of the computer system (L3), which includes an extended memory facility (L4). Access to data through the storage subsystem 10 is controlled by an access key facility that is implemented by address/key control 16 using the storage key look-up table 18 to validate access requests The memory control unit 20 coordinates access to L3/L4 main memory 22 and cache control 24 performs that function for the L2 common cache memory 25.

When memory access is requested by an external device the instruction sent from the external device is decoded by channel processor, and the request is validated by address key control 16, cache control 24 checks the L2 cache directory 26 to determine whether or not the information that is to be retrieved or modified is located in the L2 cache 25 and memory control 20 and the bus switching unit control 27 initiate a data request to L3 main memory 22 through the bus switching unit 28 associated with L2 cache control 29. When the requested data is not in L2 cache, the data is provided by the L3 main memory 22. Data retrieved from either the L3 main memory 22 or the L2 common cache 25 is transferred to external devices through the bus switching unit 28 and the I/O channel data buffers 30. When data is requested by a central processing unit the data is provided by the L1 cache, if it is found there. Data from other levels of memory is transferred to the central processing unit through its L1 cache memory. Further details of the structure and operation of this storage subsystem are disclosed in the U.S. patent application Ser. No. 159,016, filed Feb. 22, 1988, which is incorporated herein by reference.

The Trace Arrays

In accordance with a preferred embodiment of the present invention as shown in FIG. 2, cache control 24 and memory control 20 contain a master trace array (MTA) for their respective retry domains, the L2 retry domain 12 and MC retry domain 14. In addition, selected other devices in each retry domain contain simpler, device trace arrays (DTA).

An entry is made in the master trace array each time a new operation is first activated within a retry domain. Each entry appears as a horizontal line of items in the trace array shown in FIGS. 2 through 5. Each such entry contains an event trace ID (ETID) for the retry domain, which is a code assigned to the operation that initiated that entry in the master trace array. That event trace ID, for instance the L2ID in the L2 retry domain 12, continues to uniquely identify the operation as long as it is executing in the L2 retry domain.

In accordance with the present invention, each trace array has the capacity to record multiple entries. When the array is full, the oldest entry is replaced by the newest entry. Thus, the array "wraps" around to the first entry and continues to record entries. The number of entries that can be recorded in each trace array for the preferred embodiment of this invention will be not less than the maximum number of events that would be recorded for operations that could be executing in that retry domain while the storage subsystem is quiescing, starting with the clock cycle in which the primary error occurred.

Each entry in the master and device trace arrays also contains a command and address In the master trace array (MTA) they are the command and the address that was transferred to the retry domain by the instruction that initiated that trace array entry when the operation was first activated. The entry in the master trace array also contains the ID of the processor that was the source of that instruction. These items are represented by three dots in each entry in the master trace arrays and two dots in the device trace arrays shown in FIGS. 2 through 5. Each entry in these trace arrays also contains an error flag bit. The error flag bit will be set in a particular entry in a trace array if an error is detected in the particular device that includes the trace array while that device is processing the event indicated by the ETID in that entry.

The command and address associated with a given ETID in the master trace array, such as those represented in the entry for L2ID-A in FIG. 2, will not necessarily be the same as the command and address recorded in the entry in the device trace array (DTA) for event "A" because the command and address sent by the cache control device 24 to L2 cache control 29 may very well be different from the command and address for the operation that became active in cache control 24 when event "A" was first recorded by the master trace array (MTA) as L2ID-A.

For instance, in cycle 36, the L2 cache control 29 (L2CC) receives a command and an address from cache control 24 and the ETID, "H," of the operation that initiated that transfer, operation L2ID-H in cache control 24, and latches it in a temporary "scratch pad" register In cycle 37, when the L2 cache control device 29 becomes active in that operation, rather than merely latching input, these items are all then transferred from the scratch pad register to an entry in the L2CC device trace array (DTA). An entry in the L2CC device trace array will include the command, address and ETID that were transferred to the L2CC device The L2 master trace array's entry will contain the processor ID of a processor that is external to the L2 retry domain, since the master trace array's entry is latched in the scratch pad register when an operation first enters the retry domain.

Memory control 20 has a similar master trace array (MTA) for its retry domain, the MC retry domain 14, as mentioned earlier. Device trace arrays are provided in the MC retry domain for the bus switching unit control (BSUC) and for parts of the L2 cache control (L2CC) that provide processing for the MC domain. The bus switching unit control 27 serves as a subordinate master to the L2 cache control 29 in the MC retry domain, controlling the initiation of action by L2CC during events occurring in the MC retry domain.

The retry domains in this preferred embodiment do not overlap. However different portions of individual devices or different portions of a particular block of hardware—a particular semiconductor chip, for instance—may be in different respective retry domains When an operation becomes active in the next retry domain executing the instruction, a new ETID is assigned to the operation in that next retry domain and the old ETID that the operation had in the previous, foreign domain is recorded in an entry in the next master trace array along with the newly-assigned ETID. In the preferred embodiment shown in FIGS. 2 through 5, a cross reference flag bit (XR) in that entry of the master trace array is set to 1, if the foreign retry domain represented by the cross reference ETID was the source of that operation. The foreign retry domain will be identified by the position of the cross reference ETID in the entry. The source of the command outside the storage subsystem 10 will be identified by the processor ID in the trace array entry.

Each device shown in FIG. 1, if it does not have a trace array, includes an error register that sets an error flag bit when an error is detected in the device. For example, when an error occurs in the address/key control device 16 one of two error registers, one for each retry domain that uses the device, latches the ETID of the operation that failed and the error flag bit is set in that error register. In accordance with a preferred embodiment of the present invention, the error registers have the capacity to record the ETID's for multiple subsequent errors that may occur as the subsystem is quiescing.

In accordance with the preferred embodiment of the present invention shown in FIGS. 2 through 5, the ETID's within each retry domain are assigned sequentially When the event becomes active in the retry domain and the ETID is first assigned, the master device sends out the command and address to be processed by each device in the domain. In the preferred embodiment, the ETID itself is sent from the master device in the retry domain to each other device's error register or trace array, which assures synchronization among the trace arrays of each retry domain.

Instead of sending ETID's to a device error registers and trace arrays in the retry domain, a counter associated with an array or register can be incremented as each new ETID is recorded in the master trace array. If a subordinate master device initiates action by other devices in the retry domain several cycles after it itself receives a command from the master device for the retry domain, the subordinate master may be used to increment the ETID counters in those devices. This will prevent the ETID counters in such devices from changing in the several cycles that elapse before the event becomes active in those devices.

This incremental change of the ETID eliminates the need to provide additional communication capacity for synchronizing the ETID's within the retry domain. In particular, where the communication capacity of individual hardware devices within a retry domain is severely limited, the ETID counters for the devices in the domain can be actuated by each command that is received the master device, thus requiring no additional communication capacity for transfering the ETID. The length of the ETID is then governed only by the number of entries that must be recorded in the master array, as a minimum, and size constraints imposed on the error registers and trace arrays for various devices within the retry domain, as a maximum.

Figure 6A:
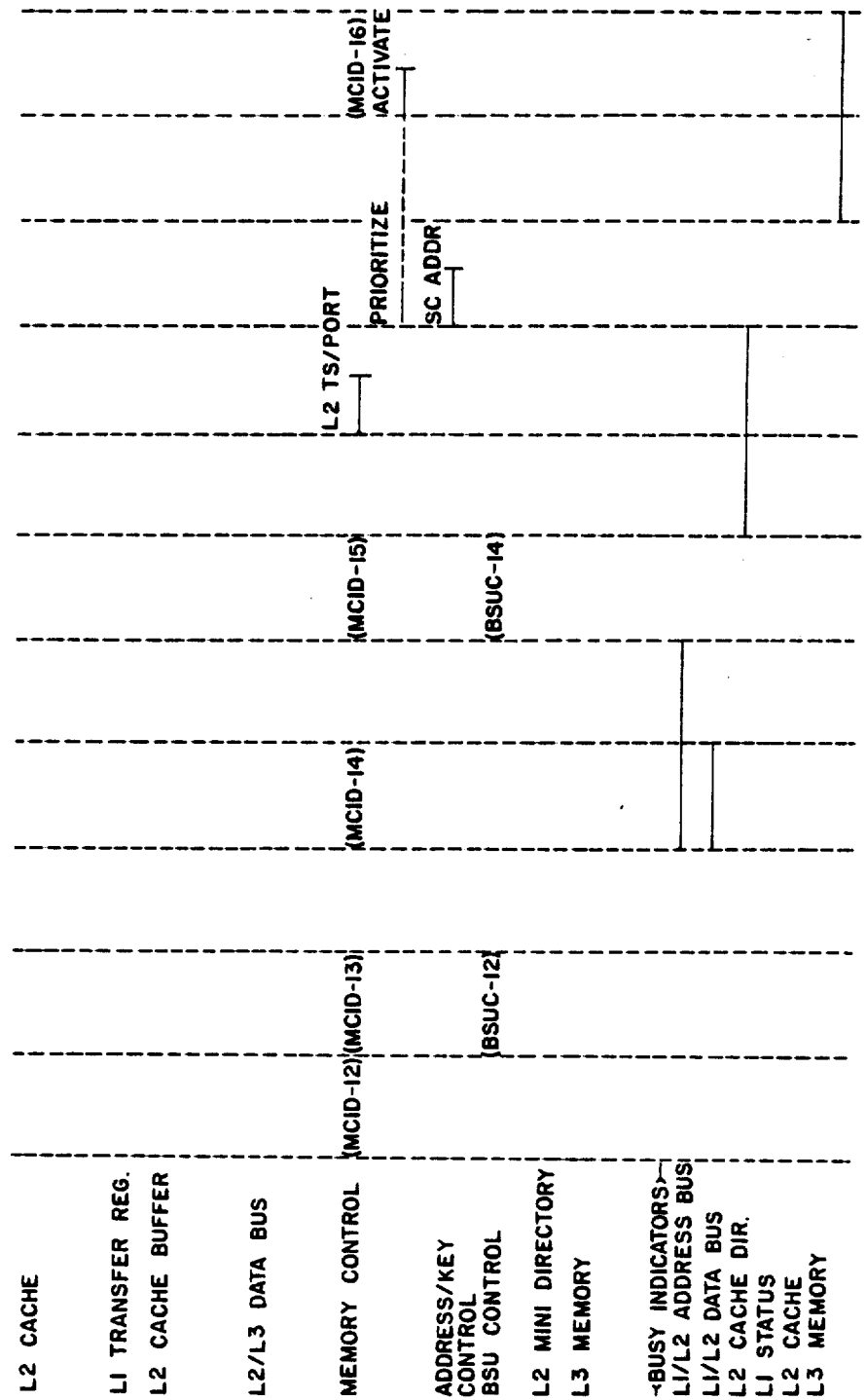
Figure 6D:
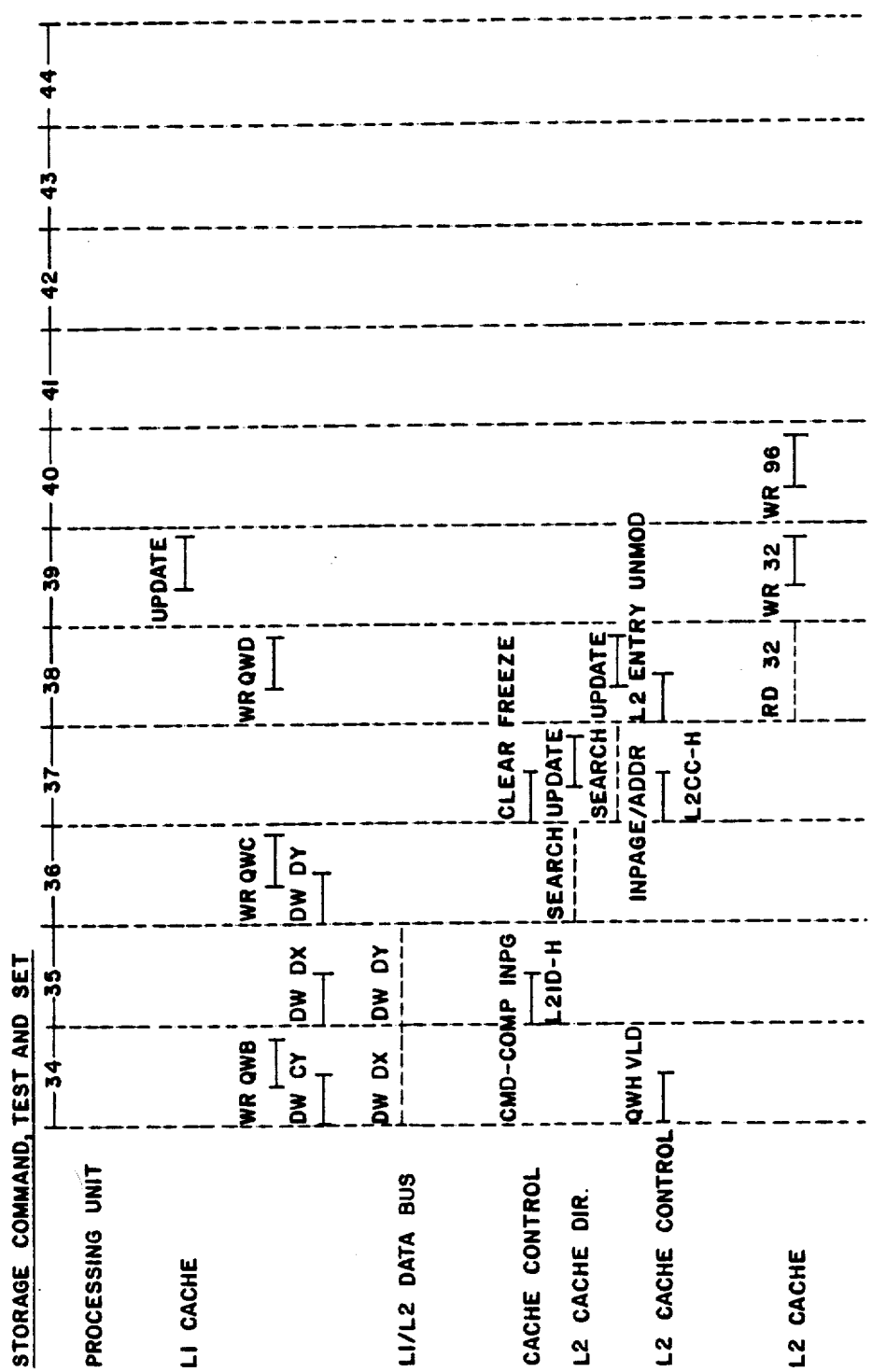

FIGS. 2 through 5 show the trace array entries initiated by the execution of a "Test and Set" instruction in the storage subsystem shown in FIG. 1. FIG. 6 is a timing diagram showing the principal activities that occur within the storage subsystem of FIGS. 1 through 5 during the execution of the Test and Set instruction. The execution of the "Test and Set" instruction by the storage subsystem of FIG. 1 is a particularly complex and lengthy operation, and one that is highly sensitive to untimely interruptions. These characteristics illustrate some of the particularly valuable features of error identification method and apparatus in accordance with the present invention.

Several ETID's appear in FIGS. 2 through 5 as entries in trace arrays for the two retry domains that are for events initiated by operations other than the Test and Set operations that are executing concurrently within the storage subsystem. These events are examples of events that may occur in this subsystem during the execution of Test and Set. They are not executing the Test and Set instruction. These additional entries are indicated on the test and set timing diagram, FIG. 6, by ETID's in parentheses.

In FIG. 6, the test and set operation is initiated in the storage subsystem 10 when the central processing unit #1 (CP1) latches a Test and Set instruction requesting exclusive access to stored data. This instruction is a request from CP1 for exclusive access to data from the storage subsystem 10. This instruction is used when accessing data that is stored in common areas of the L3 memory where conflict could occur between this request and concurrent operations initiated by other central processors or by the I/O channel processors.

This test and set operation is time consuming, requiring forty-one clock cycles to provide eight 8-byte blocks of data from L3 in response to a CPU's request, in FIG. 6. When the L2 cache contains modified data at the beginning of these test and set operations, additional time will be required at cycle 38 to store the data that was originally in L2 to L3 before Test and Set writes into the L2 cache. It is also highly complex, with as many as half a dozen actions being produced by this instruction in a given clock cycle. However, this complexity is necessary to reduce the time required to protect and retrieve data that otherwise could be modified by another processor between the time of the request and the time it is retrieved.

Many of the activities that produce the complexity and the delay in the test and set operation are peculiar to the multiprocessing environment in which this storage subsystem operates. In this environment, two or more processors, either central processors or channel processors, may seek access to the same data concurrently, either before the earlier request is complete or simultaneously. Thus data interlock procedures must be implemented in the multiprocessing environment to prevent such collisions between the processors' data requests during a given retrieval operation.

Furthermore, the storage subsystem provides two levels of cache memory to help coordinate data exchange between the multiple processors and speed data access. The common cache (L2) permits faster access to data that has been modified by one processor and, therefore, will be inaccessible to other processors for an extended period after it is modified, if the other processors must wait to retrieve it from main memory. Thus any data requested by a Test and Set instruction may be available at one of three memory levels at a given time and different versions of it may exist simultaneously, which complicates the control of stored data in this subsystem.

Because any or all of these three memory levels may contain the requested data, and because data access in the multiprocessing environment requires time-consuming testing and setting actions to prevent collisions in this storage subsystem between requests for access to certain memory addresses, the test and set operation is pipelined to expedite the data request.

Moreover, FIGS. 2 through 6 only show a fraction of the complexity of the pipelining of operations in storage subsystem 10, since the operations for other instructions that are likely to be executing in this subsystem simultaneously with the Test and Set instruction are not fully shown in these figures. The items in parentheses indicate the timing of a few, representative entries in the trace arrays for such other instructions. In cycle 16 for example, cache control 24 is executing event L2ID-F for the Test and Set instruction when event L2ID-G begins an unrelated data search. The rest of the operation initiated by L2ID-G is not shown. FIG. 6 shows clearly that it would be highly undesirable to retry all the operations that could be concurrently executing when a primary error is detected during the execution of Test and Set in the storage subsystem.

Test and Set

Central processor #1 (CP1) initiates the Test and Set instruction and calculates the storage address that will be accessed in cycles 1 and 2 shown in FIG. 6. In cycle 3, CP1 latches the desired address in its storage address register and L1 simultaneously latches the Test and Set instruction, initiates a search of the L1 cache directory to determine whether the unmodified data corresponding to the address provided by CP1 is stored in the L1 cache, and sends a lock byte to cache control 24. The lock byte, which is latched by the L2CC during cycles 5 and 6, consists of a source ID that indicates which processor is the source or "owner" of the lock and a lock bit which will deny access to the requested data location to any device other than the owner of the lock.

In the test and set operation shown in FIG. 6, the requested information was not found in the L1 cache and this result was latched as a "miss" in cycle 4 while the command text, the requested address and a lock byte were on their way to the cache control 24 to initiate a search of L2 cache. In cycle 5 the L1 cache invalidates its entries to clear a place for the data that it will receive and the address of the L1 location that was cleared is latched by cache control 24 in cycle 6. However, in cycle 7 cache control 24 sends a data request to memory control 20 and reports the type of command and the requested address to the address/key control device 16. In cycle 10 an L3 memory port is already reserved for this operation, even though whether or not access to L3 main memory is needed will not be known until cycle 15.

Event L2ID-C became active in L2 domain when cache control 24 requested access to L3 main memory 22 in clock cycle 7, not when it merely latched incoming information in cycles 5 and 6. Similarly, although memory control 20 latches cache control's request in cycle 8, memory control 20 is not active until cycle 11. Thus the event MCID-16 begins in the MC domain in cycle 11, in response to the request of cache control 24 for memory access, not in cycle 8. Thus MCID-16 does not appear in the trace array for cycle 8, which is FIG. 2. It is recorded in cycle 11, and so, appears in FIG. 3 which reflects the status of the registers as of cycle 12.

After cache control 24 sends its request to memory control 20 for access to L3 main memory 22, it then searches the L2 directory in cycle 15 to determine if data is needed from the L3 main memory 22, while memory control 20 prepares to respond to cache control's previous request for data. Address/key control 16 implements the search of the L2 cache directory by transferring the necessary data address to cache control in cycle 12 along with a command to invalidate and flush the L2 line, "ifL21." This assures that the most recent form of the requested copy is stored in L3 and protects the integrity of the data in the storage subsystem by transferring any modified form of the requested data found in the L2 cache to L3 main memory when the search of L2 cache directory in cycle 14 is successful. It is not sucessful in FIG. 6b, resulting in a "miss" at cycle 15.

The search of the L2 cache directory 26 is designated event "F", that is, L2ID-F in FIG. 4. Again, the ETID-F was not assigned in retry domain L2 until cycle 14 because cache control 24 was not active in cycles 12 and 13. Cache control 24 was only latching information and holding priority at that time.

In the meantime, the activation of memory control 20 in cycle 11 has caused the bus switching unit control 27 to prepare its buffer for receiving the data requested from L3 in cycle 12, which is recorded as event "16" (MCID-16) in the BSUC device trace array for the MC retry domain. In cycle 13, address/key control 16 implements the search of L3 main memory 22 by transferring the necessary data address While cache control 24 is searching the L2 directory 26 in cycle 14, the bus switching unit control 27 is latching the L3 address transferred by address/key control 16. Again, regardless of the outcome of the search of the L2 directory 26 in cycle 14, L2 cache control prepares to load its outpage buffer in cycle 15—at which time event "F" appears in the L2CC/L2 device trace array that records events occurring in the interaction of the L2CC device with retry domain L2. L2 cache also proceeds to read 32 bytes in cycle 16 despite the "miss" that was latched in cycle 15 after the L2 directory search was unsuccessful. In cycle 15 a search of L1 status listings is underway to prepare for a transfer of data from L3 by invalidating any copies in the L1 caches, while the result of the unsuccessful search of the L2 directory is latched. Since the data requested was not found in L2, no L1 status entries will be found for that data in the L1 caches. Also, no data will be flushed to L3.

The "miss" status of the search in the L2 directory indicates that the requested data was not found. Thus, in cycle 16, Test and Set forces an "unmodified" status in L2 cache that is latched by memory control 20. This permits Test and Set operation to flush any copy of the requested data found in L2 cache to L3 main memory, whether or not CP1 is the "owner" of the lock on that data. The command "L2 reply," latched in cycle 15, identified L2 as the source of this status report to memory control 20. The forced unmodified status of L2 is also latched by both L2CC and BSUC in cycle 16 while address/key control 16 receives a target address in L2 cache for the data that will be sent from L3 main memory 22.

Cache control 24 simultaneously records the address sent to address/key control, implementing a freeze on that location which prevents other operations from interfering with event "F" in the L2 cache. This freeze protects any requested data that may be in the L2 cache, but may be "owned" by another processor. The freeze is very timely in the test and set operation shown herein since, in FIGS. 4 and 6, an unrelated data request causes event "G" to become active in the L2 retry domain by searching the L2 cache directory at the same time that event "F" is setting the freeze on access to its data in L2 cache.

In cycle 17, the failure to find the requested data in L2 cache results in BSUC issuing a fetch command and L2CC getting an inpage command from the MC master device, memory control, through BSUC. Memory control 20 identifies the bus to be used for the transfer, and in cycle 18, it notifies address/key control 16 that the data is about to be transferred to L2 cache. In cycle 19, the L3 memory access begins, while a status flag is set in cache control 24 to indicate that data is about to be written into L2 cache, that is, an "inpage" is pending, and that the data to be written is to be handled as data modified by event "F." This gives the central processor which initiated event "F," exclusive access to the data.

Data from the L3 main memory appears on the data bus in clock cycle 26. The L2 cache buffer and the L1 transfer register receive the lock byte for the requested data in cycle 27, which protects the data being transferred to them by event "F," and they begin to latch the data in cycle 28. The last transfer in the blocks of eight data transfers made by main memory is latched by the L2 cache buffer, in cycle 35. Cache control 24 acknowledges the receipt of the complete block of data transferred from the L3 retry domain by automatically initiating event L2ID-H after the last of the eight transfers in the block is latched, in cycle 36.

The L1 cache buffer also latched data transferred from L3 main memory at the same time as the L2 buffer but it has only half the capacity of the L2 buffer, and it received the last transfer that it could accommodate in clock cycle 36. This data from main memory 22 is written into the L1 cache by the end of clock cycle 38, before the data from L3 can be written into L2 cache. The L1 cache directory is updated in cycle 39, assuming no operations are already pending in L1 cache to delay this write and update sequence—which completes the retrieval of the requested data.

After issuing the command in cycle 35 to complete "inpage," the data transfer to L2 cache which activated L2ID-H, cache control 24 searches the L2 cache directory. L2 cache directory is updated in cycle 37. In cycle 37, cache control also clears the freeze that was set on the L2 cache in cycle 16. The status of L1 is checked by cache control in cycle 37, and updated in cycle 38 to mark the data transferred to it by event "F."

Event "H" becomes active for the L2CC device in retry domain L2 in cycle 37, as shown in FIG. 5. However, before data is written into the L2 cache in cycle 39, L2CC, BSUC, and memory control latch the actual status of the data in the location in the L2 cache where Tes and Set will write its data. In this instance, the data is actually unmodified, which indicates that a copy of this data already exists in the L3 main memory and no transfer back to L3 memory is needed.

In cycle 34, after the last byte appeared on the bus from L3 main memory, memory control 20 is notified that L3 is no longer busy. In cycle 37 memory control 20 continues event MCID-16 with a "complete inpage/port" command and memory port address in response to the "complete inpage" operation L2ID-H in cache control in cycle 35. Since no modified data needs to be flushed from L2 to L3, address/key control 16 and memory control 20 merely update the L2 mini directory 31, a duplicate of information in the L2 cache directory, that is used by the MC retry domain to respond to data requests from the I/O channels, SHCPA, SHCPB, and NIO. Event MCID-16 and this entire test and set operation are then complete by the beginning of cycle 42.

All three levels are prepared for this data transfer from L3 to L1, and the marking of the status of these transfers and the cataloging of the resulting data locations proceeds to completion at each level even though the data transferred to the L2 level is not used immediately. This is done to prevent the various operations that must be undertaken at each level of this three-level storage subsystem from compounding the data transfer delays that are inherent in a data transfer from any one of these levels in this multiprocessing environment.

Also, because access to main memory is slow, but large blocks of data can be routinely transferred by main memory very quickly, the maximum amount of data that the caches could store was transferred from main memory by the test and set operation described above. However, since L1 was the data's destination, half of the block of data transferred by L3 main memory to L1 was necessarily never reached L1 directly. The rest will be available from L2, which is more readily accessible than L2. Had the data request come, instead, from a channel processor, for example SHCPA, the entire block of data might have been transferred through the L2 cache.

The various testing and setting procedures initiated by the Test and Set instruction both mark and catalog the results of these complex data transfers, as well as preventing collisions between data requests. Because the modified/unmodified mark set for each cache location is tested before the data is retrieved, the interruption of a data transfer before the data is marked and catalogued in the appropriate directory could produce a memory fault that makes an area of memory unaccessable to normal data requests until a separate recovery operation is undertaken. Thus, when an error is detected in an operation, it is important to permit the entire data transfer that is in progress to go to completion, rather than risk leaving unmarked or uncatalogued information in the storage subsystem.

Furthermore, L3 main memory 22 and the storage subsystem 10 are in separate clock domains. This means that an interrupt generated in the storage subsystem 10 would not necessarily properly coincide with an interrupt of the clock in L3 main memory 22.

It is also generally not desirable to abruptly halt the operation of a device in a given retry domain, even though the error flag for that device is set, because the device error that was detected may be an intermittent error. Halting the operation of one of the devices shown in FIG. 1 when its error flag is set may interfere unnecessarily with the quiescing of the entire storage subsystem by blocking the continued execution of other, overlapped operations using that device, operations that might possibly go to successful completion.

Quiescing operations in accordance with the present invention permits orderly completion of all operations executing in a subsystem when a device error occurs, while accurately identifying the devices and the operations executing in the subsystem that were affected by device errors, to provide efficient retry and data recovery operations. To limit the scope of the retry operation, the execution of new operations by the subsystem is prohibited during quiescence, rather than halting operations that are already in progress there. The operations that are affected by the error are then identified after the execution of those operations is complete in the subsystem.

Recovery Operations

A preferred embodiment of the computer system containing the memory subsystem shown in FIG. 1 also includes a service processor 32 which controls the system's recovery from errors occurring in the storage subsystem. The service processor 32 reads data recorded in the master trace arrays and the device trace arrays, after operations in the storage subsystem have quiesced, to determine which operations will be retried by the computer system. An appropriate service processor would be, for example, an IBM Personal System/2 in combination with a system service adapter (SSA), as is disclosed in copending U.S. patent application Ser. No. 07/213,560 filed June 30, 1988 by K. C. Huang et al. which is incorporated herein by reference.

Means for setting machine check error flags when a device error occurs are well known in the art. Each time an error flag is set in the storage subsystem, the location of that error is reported to the service processor. The service processor, in accordance with the preferred embodiment of the present invention, has the ability to halt all or part of the operations being executed in other areas in the computer system when an error is reported. However, when an error flag is set in the storage subsystem and selected other areas where extensive pipelining may occur, as in the native channel processor (NIO), operations will normally be quiesced, rather than stopping the clocks which halts them immediately. In accordance with the preferred embodiment, the storage subsystem and other areas where there is extensive pipelining of operations are only halted by stopping their clocks on an emergency basis.

To determine which operations must be retried, the service processor latches all errors occurring within the storage subsystem during the particular clock cycle in which the first error was reported to the service processor as primary errors. When the primary error occurs, that error blocks the entry of any additional ETID's in the master trace arrays in the storage subsystem. With entry into the master trace arrays blocked, no new instructions will begin execution in that subsystem. Then, as all operations in the storage subsystem are quiesced, processing in the storage subsystem stops and the service processor reads and stores the contents of all the error registers and trace arrays.

The location of the one or more primary errors, i.e. information that was latched when an error was first detected in the storage subsystem, is used by the service processor to determine the ETID associated with the first operation in which an error flag indicates that an error occurred at the location where a primary error occurred.

If the device reporting a primary error has an error register, the ETID of the first operation that failed was latched by the register when an error flag was first set for that device. The service processor will select the first ETID that was latched by the error register as the ETID of the primary error in that device. If a primary error was reported from a device that recorded the error in a trace array, the service processor will determine the ETID of the first error-flagged entry occurring in that trace array. All ETID's that occur in entries that contain the ETID of the primary error as a cross reference are also identified by the service processor. This eliminates the need to halt the affected processes before they cross out of the retry domain in which the error occurred, as was done by previous devices.

Any individual errors that occur during quiescence, errors whose ETID's appear in the trace arrays and error registers but are not cross referenced to the ETID's of primary errors, will also be identified by the the service processor, as "secondary" errors. This is particularly important when intermittant errors occur that do not halt operations in the retry domain but, instead, may continue to produce damaged data.

The commands and addresses associated with the ETID's of these individual errors and the ETID's cross referenced to them are used by the central processor that initiated each such instruction to invalidate damaged data. This damaged data includes any data modified by an affected command. The CPU will replace damaged unmodified data entries in the caches with a copy from L3 main memory, if it is available. If modified data was damaged by a memory failure, particularly a failure in L2 cache memory, the service processor will attempt to recover that data. When the data needed for retry of an operation is not available, the pending retry of that operation is aborted.

Once all the individual errors are identified by the service processor, whether primary or secondary, the service processor resets all error flags, error registers, and trace arrays. The service processor also resets any channel processor or CPU interface that was affected by the failure. The service processor then restarts the storage subsystem, initiating the retry of each affected operation with the result of the unaffected event that occurred prior to each individual error.

Because ETID's are assigned each time an operation is transferred to a retry domain, the present invention permits a retry of an operation to commence at some point during the execution of an instruction within the storage subsystem rather than beginning retry at the very beginning of the execution of that instruction in the storage subsystem. This precise identification of the point at which the error occurred minimizes the retry effort and also limits the amount of data that must be invalidated and reconstructed, even though all operations executing in the subsystem are permitted to quiesce.

Also, because the ETID's are cross referenced between retry domains when execution of an operation is continued in another retry domain, the ETID of the primary error identifies all subsequent affected operations. The present invention thus provides an opportunity to recover each individual error occurring during quiescence, starting at the primary error and including all operations affected by errors.

This invention is defined by the appended claims. However, it will be apparent to one skilled in the art that modifications and variations can be made within the spirit and scope of the present invention. In particular, this invention is applicable to processing units as well as storage subsystems and the ETID's themselves may include device-specific or command-specific code that explicitly links the event to a particular source or activity as well as uniquely identifying

What is claimed is:

1. A computer system having retry domains comprising:
   first and second hardware devices coupled to each other such when one of said devices yields an error, said error can propagate to the other device, each of said devices including a trace array having at least one entry, each entry in the trace array including at least an event trace ID and an error flag, said event trace ID identifying an operation occurring in said device, wherein the insertion of said event trace ID in the trace array is initiated by the execution of said operation in said retry domain.

2. The computer system of claim 1 wherein each entry in said trace array further includes retry information associated with the event trace ID including at least one of the following items: a command, or an address, or a processor ID.

3. The computer system of claim 1 wherein said entry in said trace array includes a first event trace ID and a second event trace ID, said first event trace ID identifying an event that occurred in said device and said second event trace ID identifying the event in another retry domain that initiated the insertion of said entry in said trace array, whereby a failure in another retry domain that has affected an event in said device can be identified.

4. The computer system of claim 1 wherein said trace array further includes at least one historical entry for said devices, said historical entry including the event trace ID of a preceding event that occurred in said device, thereby providing a record of events occurring before the most recent event.

5. The computer system of claim 4, wherein said entry further includes a cross reference flag bit whereby the event identified by one of said event trace ID's is identified as initiating the events identified by said other event trace ID in said entry.

6. A computer system having first and second retry domains, each of said retry domains comprising:
a first device having a master trace array, said master trace array including an event trace ID and an error flag bit for said first device; and
a second device, coupled to said first device to receive commands to implement a function, and having a device trace array, said device trace array including an event trace ID recorded in the master trace array of said first device and an error flag bit for said second device, and wherein
said first and second retry domains are coupled to each other such that said first and second retry domains have the ability to cooperate to implement said function.

7. The computer system of claim 6 wherein said retry domain further comprises means for incrementing the event trace ID for said trace arrays in said retry domain.

8. A method of error identification for a computer system having first and second retry domains in which a given operation is executed, said method comprising the steps of:
determining an event trace ID to uniquely identify a given operation executed in the first retry domain among any event trace ID's for said retry domain that are recorded in trace array entries in said retry domain;
recording said event trace ID in a master trace array for a first device in the first retry domain; and
setting an error flag bit in the trace array entry having said event trace ID in said master trace array when an error occurs in said hardware device during said event.

9. The method of claim 8, further comprising the step of recording said event trace ID in the second retry domain in which the given operation is subsequently executed so that the event trace ID associated with the given operation in the previous retry domain is also identified with the given operation in the next retry domain in which the operation is executed.

10. The method of claim 8 wherein said event trace ID is determined by incrementing the event trace ID entered in the trace array each time an operation is executed in said retry domain.

11. The method of claim 10, said method further comprising the step of initializing the event trace ID's in said trace arrays in said retry domain to a predetermined value at a given time so that the event trace ID's recorded at any given time in the entries for events occurring in said retry domain are unique to a respective event.

12. The method of claim 10, further comprising the step of recording the event trace ID for the first retry domain in temporary storage means in a device in said retry domain each time an event ID for the first retry domain is recorded in said master trace array, so that the event trace ID recorded in said device trace array when the given operation is executed by said device will be the event trace ID for the operation.

13. A method of error recovery for a subsystem of a computer system, said subsystem having more than one retry domains, each retry domain having a master trace array containing a plurality of entries, said method comprising the steps of:
(a) identifying the device in which a primary error has occurred, said device containing at least one first trace array;
(b) reading each of said first trace arrays and identifying the respective event trace ID and retry domain of each entry in each of said first trace arrays in which an error flag is set;
(c) reading the trace arrays in said plurality of retry domains and identifying other event trace ID's in entries in which an error flag is set that contain the event trace ID's that were previously identified;
(d) repeating step (c) until no other event trace ID's are identified; and
(e) repeating these steps for each primary error.

14. The method of error recovery recited in claim 13, said method further comprising the steps of:
preventing the execution of new operations in said retry domains; and
permitting the operations executing in said identified retry domains when a primary error is detected to run to completion before performing steps (b) through (e), whereby the impact of an intermittent error in one device on other operations in the subsystem is minimized, while preserving adequate retry information.

* * * * *